Figure 1:
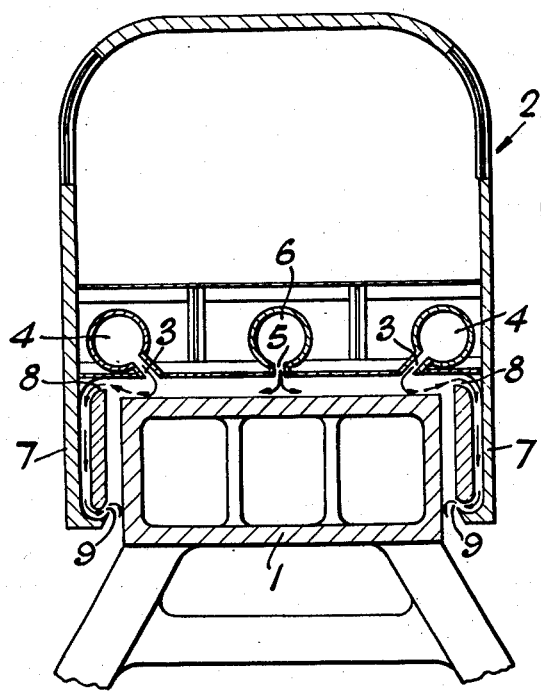

March 23, 1965  C. S. COCKERELL  3,174,440

VEHICLES FOR TRAVELLING ALONG A PREPARED TRACK

Filed Aug. 2, 1961  3 Sheets-Sheet 1

Inventor
C. S. COCKERELL
By Cameron, Kerkam & Sutton
Attorneys

March 23, 1965  C. S. COCKERELL  3,174,440
VEHICLES FOR TRAVELLING ALONG A PREPARED TRACK
Filed Aug. 2, 1961  3 Sheets-Sheet 2

INVENTOR
C. S. COCKERELL
BY Cameron, Kerkam + Sutton
ATTORNEYS

March 23, 1965   C. S. COCKERELL   3,174,440
VEHICLES FOR TRAVELLING ALONG A PREPARED TRACK
Filed Aug. 2, 1961   3 Sheets-Sheet 3
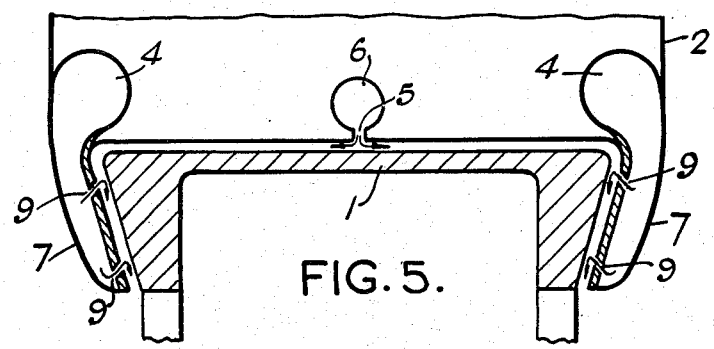
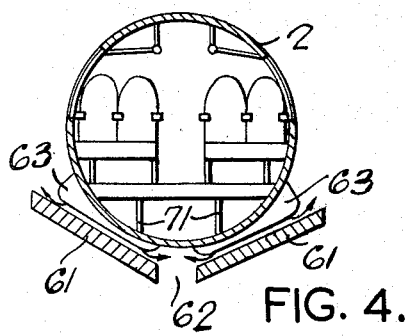
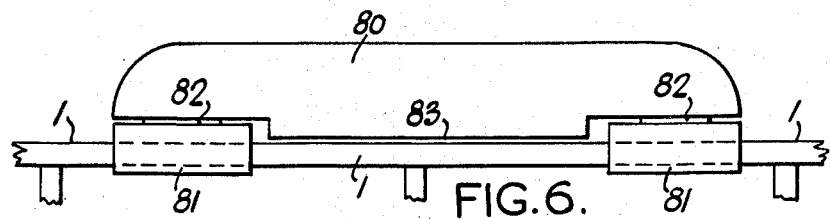
Inventor
C. S. COCKERELL
By Cameron, Kerkam & Sutton
Attorneys United States Patent Office 3,174,440
Patented Mar. 23, 1965

3,174,440
VEHICLES FOR TRAVELLING ALONG A
PREPARED TRACK
Christopher Sydney Cockerell, Southampton, England,
assignor to Hovercraft Development Limited, London,
England, a British company
Filed Aug. 2, 1961, Ser. No. 128,742
Claims priority, application Great Britain, Aug. 9, 1960,
27,618/60
6 Claims. (Cl. 104—120)

This invention relates to vehicles for travelling over a prepared track, and at least partly supported over the track on a cushion of air, enabling wheels, with their speed and load restrictions, to be dispensed with, at least for the high speed portion of the vehicles' operating range.

Trains are capable of attaining quite high speeds, but to avoid the necessity for using special duty wheels, there is an upper limit to the speed economically attainable. In addition the use of metal wheels creates vibration and noise. Trains have an advantage, however, in that they are guided by rails and no steering control is required. Cars, coaches, and the like, can also be made to operate at high speeds but again special wheels and special tyres are necessary for high speeds. The steering, however, is under the control of the driver, and this also gives rise to severe operating restrictions.

A vehicle which is guided by a track over which it travels provides a system which is free of restrictions due to steering problems, and by supporting the vehicle on the surface or surfaces of the track by one or more cushions of pressurised gas, operating speeds can be raised. It has been proposed in co-pending U.S. patent application Serial No. 627,925, filed December 12, 1956, to support a vehicle over a surface by means of a pressurised cushion of gas contained by a curtain formed by a jet of fluid issuing from the bottom of the vehicle. The present invention is based on the discovery that it is possible to use the same method of containing a pressurised gaseous cushion to support a vehicle over a prepared track having guiding surfaces. According to the invention there is provided a vehicle for travelling along a prepared track provided with at least two oppositely facing surfaces each having a vertical component of direction, said vehicle having at least two cushion surfaces one of which is arranged to face towards and co-operate with each of the said two surfaces of the track and means associated with each of said cushion surfaces for forming at least one curtain of fluid which in operation flows across the gap which exists between the said cushion surfaces and the track, the said curtains operating to form, maintain and contain at least in part a cushion of pressurised gas whereby the vehicle is maintained in spaced relationship to the said track surfaces.

In certain circumstances it may be necessary that the prepared track, in addition to being provided with surfaces having a vertical component of direction capable of providing a component of sideways thrust to guide the vehicle, also has at least one surface capable of providing a downward component of thrust.

Vehicles according to the invention are particularly suitable for high-speed passenger transport, and can be arranged to operate on prepared tracks built over existing transport systems such as roads and railways.

The fluid used for the formation of the curtains, and the gas forming the cushion is generally air, and will be considered so hereinafter although other fluids and gases may be used.

Figure 3:
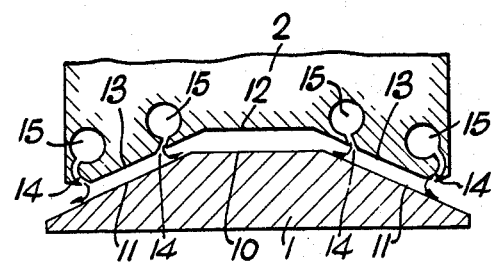
Figure 2:
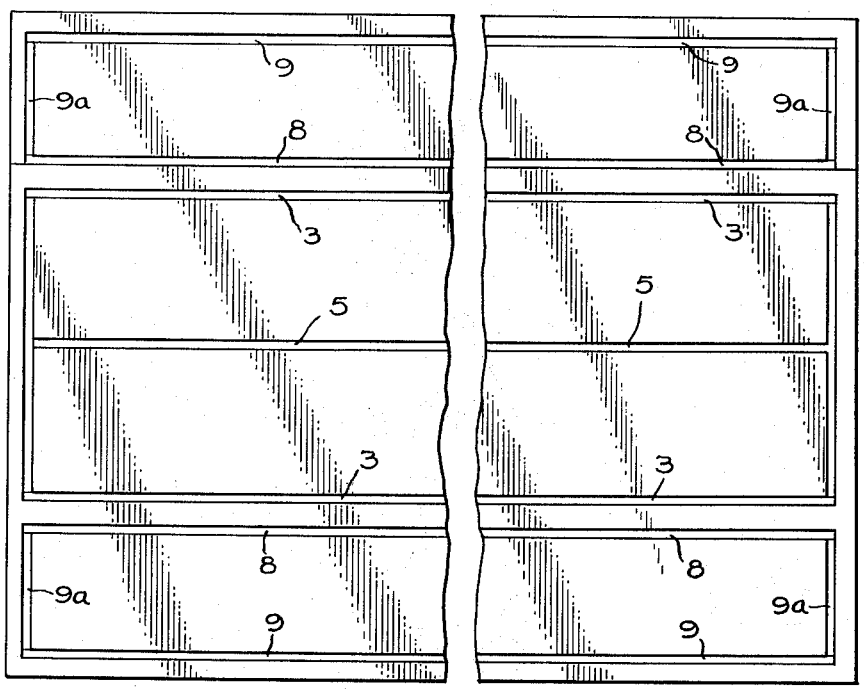
Figure 7:
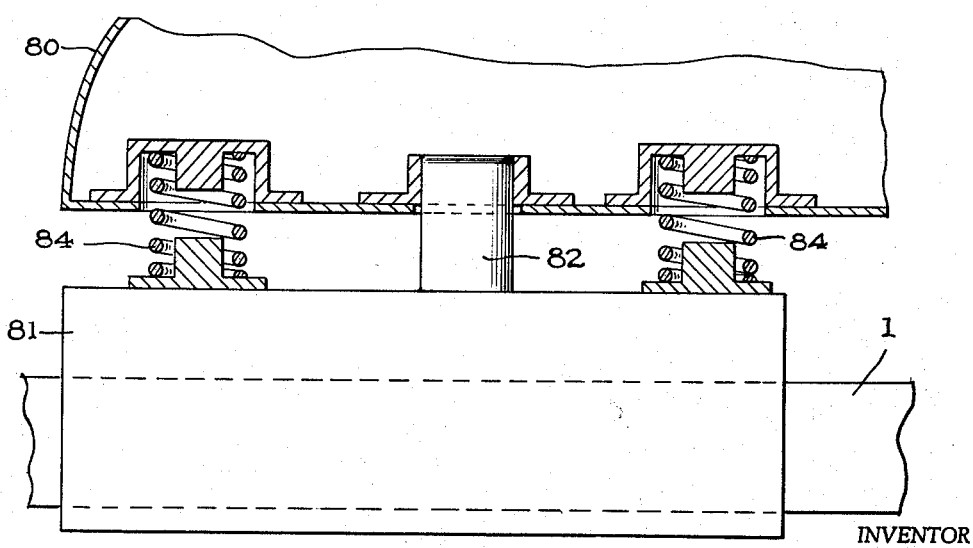

The invention will be understood by the following description of various embodiments in conjunction with the accompanying drawings in which:

FIGURE 1 is a vertical cross-section through one form of prepared track and vehicle, normal to the longitudinal axis of the vehicle, FIGURE 2 is a developed view of the cushion surfaces and ports of the vehicle shown in FIGURE 1, FIGURE 3 is a fragmentary vertical cross-section, normal to the longitudinal axis of the vehicle, illustrating a modified form of prepared track and co-operating parts of the vehicle, FIGURE 4 is a vertical cross-section of a vehicle embodying the invention, normal to the longitudinal axis thereof and showing the prepared track formation, FIGURE 5 is a fragmentary vertical cross-section similar to FIGURE 1, illustrating a modification thereof, FIGURE 6 is a diagrammatic side elevation of a further form of vehicle embodying the invention, and FIGURE 7 is an enlarged fragmentary side view, partially in section, of a modified form of the vehicle shown in FIGURE 6.

The particular form of the track and the shape of the co-operating portions of the vehicle may vary considerably, as may also the form of the vehicle and its means of propulsion. FIGURES 1 to 5 illustrate some of the various forms of track.

In the embodiment illustrated in FIGURES 1 and 2, the track 1 is of rectangular cross-section and may be prepared on the ground, or, as shown, supported above the ground. The vehicle 2 is supported on the top surface of the track 1 by a cushion of pressurised gas formed and contained by curtains of air issuing from supply port 3. The supply port 3 is formed in the bottom surface of the vehicle and encloses a substantial part of the area of this bottom surface to form a cushion surface. Air is fed to the supply port 3 from ducts 4. The cushion formed beneath the bottom of the vehicle is subdivided by a further curtain of air issuing from a supply port 5 in the longitudinal centre line of the vehicle. Air is supplied to the supply port 5 from a duct 6.

Two side walls 7 depend, one on each side, from the bottom of the vehicle, being spaced a small distance from and parallel to the sides of the track 1. The air issuing from the supply port 3 in the bottom surface of the vehicle is deflected outwards by the cushion pressure. Along the side of the vehicle the air so deflected flows into recovery ports 8 formed at the top edges of the side walls and is ducted to supply ports 9 formed near the bottom edges of the side walls, as shown. Supply ports 9a extending vertically between supply ports 9 and recovery ports 8 are also formed at each end of the side walls to enclose spaces between the side walls and the sides of the track. A cushion of pressurised air is formed and contained within the spaces by the air curtains.

FIGURE 3 illustrates an example in which the track is of flattened trapezoidal cross-section, having a flat top surface 10 and two sloping side surfaces 11. The bottom surface of the vehicle 2 is correspondingly shaped having a flat surface 12 in the centre and two sloping surfaces 13, one on each side. In each surface 13 of the vehicle there is formed a continuous supply port 14, each port enclosing an area of the sloping surface to form a cushion surface. Air is fed from ducts 15 to the supply ports 14 and issues from the supply ports to form air curtains. A cushion of pressurised air is formed and contained between each of the pairs of cooperating surfaces 11 and 13. The air from the inner portions of the supply ports 14 flows into the space between the surfaces 10 and 12 and escapes from the rear of the vehicle.

In the examples so far described, the vehicle has been considered as being supported by one or more cushions which extend for a major part of the vehicle length and over a substantial part of the bottom surface. The vehicles are intended for speeds which may be in the range of 150 to 300 miles per hour, and such speeds create difficulties in retaining the cushion or cushions beneath the vehicles. Due to their large area they are of comparatively low pressure and the containing air curtain is correspondingly of low strength. At high speeds the stagnation pressure generated at the front of the vehicle by its motion will higher than the cushion pressure and may be high enough to prevent the formation of a curtain, particularly when any added effect of a wind is included.

One way of overcoming this difficulty is to make the supporting air cushions of restricted area and high pressure. Further, by forming the track with inclined surfaces, the support and guiding air cushions can be combined. FIGURE 4 illustrates such an arrangement wherein the cushions between the guiding surfaces and the cushion surfaces are formed on a plurality of relatively small, spaced apart pads 63 attached to the vehicle body in inclined positions. The track 61 is in the form of two inclined surfaces, forming a shallow V, and the cushion surfaces on the pads 63 are parallel to the inclined surfaces of the track. The cushions of air formed between the cushion surfaces on the pads and the surfaces of the track are at a high pressure and the air curtains are strong enough to withstand the pressure built up due to the vehicle's motion. An advantage of such spaced apart pads is that improved directional stability is obtained. By forming the track as shown, and providing a gap 62 between the two surfaces, it is self cleaning as water, debris and the like fall through the gap. In the example shown in FIGURE 4, the air for the curtains may be provided by compressors situated at the rear of the vehicle from which the air is ducted by ducts 71 beneath the seats illustrated in the figure.

At high speeds, particularly with side winds, a lifting force may occur aerodynamically, tending to lift the vehicle off the track. To overcome this effect, the track is formed with at least one surface which provides a force opposing the lifting of the vehicle beyond a predetermined level. FIGURE 5 illustrates one such track formation. The track 1 is, in effect, a modification of that illustrated in FIGURE 1. The sides of the track slope inwards from the top surface, the vehicle being shaped to conform, as shown. In other respects the vehicle is substantially as in FIGURE 1, the main exception being that simple air curtains are formed from supply ports 9.

For traversing curves, it is essential that either the clearances between the track surfaces and the cushion surfaces formed on the co-operating vehicle parts are sufficient to avoid contact, or provision must be made for so altering the vehicle configuration that contact will not occur. For very slight curves of large radius it is sufficient to so design the clearance that they are sufficiently large. For smaller radii, however, the clearances would need to be very large, requiring a large mass flow of curtain forming air.

A further alternative is to mount support pads on structures similar to bogies on railway carriages. One such example is illustrated in FIGURE 6. The main body 80 of the vehicle is mounted at each end on a short section 81 which embraces the track 1. The formation of each section 81 can be of the form illustrated in FIGURE 1. The main body 80 is attached to the sections 81 by pivotal connections 82. The centre portion of the main body has a surface 83 which is spaced a short distance away from the top surface of the track but does not embrace the sides of the track. A cushion of air may or may not be formed between the surface 83 and the top surface of the track.

The main body of the vehicle may be spring mounted on that part, or those parts, co-operating with the track. Thus, for example, in the vehicle of FIGURE 6, the main body 80 may be spring mounted on the sections 81 as indicated at 84 in FIGURE 7.

Undesirable movements of the vehicle, side to side or up and down may be at least partly reduced by varying the mass flow of the air forming the curtains, and/or by varying the areas or centre of pressure of the cushion or cushions, as described in co-pending U.S. patent applications Serial Nos. 16,677 and 59,306, filed March 22, 1960 and September 29, 1960, respectively.

The vehicle can readily be made so that the load carrying portion is a self-contained unit which can be loaded and unloaded separate from the remaining portion which comprises the power plant and propulsion means and carries the surfaces which co-operate with the track. With such a vehicle, a loaded portion can be positioned on to the supporting and propelling portion, conveyed to its destination and removed, a further loaded portion being then positioned in its place.

I claim:

1. A vehicle for travelling along a prepared track, said track being provided with surfaces for guiding and supporting said vehicle including at least two oppositely facing surfaces each having a vertical component of direction, said vehicle having cushion surfaces co-operating with the surfaces of said track including at least two cushion surfaces arranged to face towards and cooperate with said two oppositely facing surfaces of the track, and means including at least one supply port in each of said cushion surfaces adjacent to the periphery thereof for forming at least one curtain of fluid which in operation flows across the gap which exists between the said cushion surface and the co-operating surface of the track at a substantial angle to said co-operating surface, each of said curtains operating to form, maintain and contain at least in part a cushion of pressurised gas whereby the vehicle is maintained in spaced relationship to said track surfaces.

2. A vehicle for travelling along a prepared track, said track being provided with at least two oppositely facing surfaces for guiding said vehicle each having a vertical component of direction, and at least one substantially horizontal surface for providing support for a major part of the weight of the vehicle, said vehicle having cushion surfaces co-operating with the surfaces of said track including at least two cushion surfaces arranged to face towards and co-operate with said two oppositely facing guiding surfaces of the track and at least one substantially horizontal cushion surface arranged to face towards and co-operate with said substantially horizontal supporting surface of the track, and means including at least one supply port in each of said cushion surfaces adjacent to the periphery thereof for forming at least one curtain of fluid which in operation flows across the gap which exists between the said cushion surface and the co-operating surface of the track at a substantial angle to said co-operating surface, each of the said curtains operating to form, maintain and contain at least in part a cushion of pressurised gas whereby the vehicle is maintained in spaced relationship to said track surfaces.

3. A vehicle as claimed in claim 2 wherein the cushion surfaces co-operating with the guiding surfaces of the track are substantially vertical.

4. A vehicle for travelling along a prepared track, said track being provided with surfaces for guiding and supporting said vehicle including at least two oppositely facing surfaces each having a vertical component of direction, said vehicle having cushion surfaces co-operating with the surfaces of said track including at least two separate cushion surfaces arranged to face towards and co-operate with each of said two oppositely facing surfaces of the track, and means including at least one supply port in each of said cushion surfaces adjacent to the periphery thereof for forming at least one curtain of fluid which in operation flows across the gap which exists between the said cushion surface and the co-operating surface of the track at a substantial angle to said co-operating surface, each of the said curtains operating to form, maintain and contain at least in part a cushion of pressurised gas whereby the vehicle is maintained in spaced relationship to said track surfaces.

5. A vehicle as claimed in claim 4 including a substantially horizontal cushion surface arranged for co-operation with a substantially horizontal surface of said track to provide support for a major part of the weight of the vehicle, and wherein the curtain forming means associated with said horizontal cushion surface operates to form, maintain and contain at least two separate cushions of pressurised gas between said horizontal cushion surface and the co-operating horizontal surface of the track.

6. A vehicle for travelling along a prepared track, said track being provided with surfaces for guiding and supporting said vehicle including at least two oppositely facing surfaces each having a vertical component of direction, said vehicle having a main body and a plurality of separate parts movably attached to said main body, said vehicle also having cushion surfaces co-operating with the surfaces of said track including at least two cushion surfaces formed on said separate parts arranged to face towards and co-operate with said two oppositely facing surfaces of the track, and means associated with each of said cushion surfaces for forming at least one curtain of fluid which in operation flows across the gap which exists between the said cushion surfaces and the co-operating surfaces of the track, each of the said curtains operating to form, maintain and contain at least in part a cushion of pressurised gas whereby the vehicle is maintained in spaced relationship to the said track surfaces.

References Cited by the Examiner
UNITED STATES PATENTS

| | | | |
|---|---|---|---|
| 930,244 | 8/09 | Theryc | 104—134 |
| 1,000,009 | 8/11 | Jenison | 104—134 |
| 1,422,394 | 7/22 | Wagner | 104—23 |
| 1,727,720 | 9/29 | Kruckenberg. | |
| 2,511,979 | 6/50 | Goddard | 104—138 |
| 2,717,744 | 9/55 | Birnbaum | 244—63 |
| 2,869,479 | 1/59 | Hutchinson | 104—155 |
| 2,969,751 | 1/61 | Toulmin | 104—23 |
| 2,971,473 | 2/61 | Raynaud | 104—134 |
| 2,985,114 | 5/61 | Linder | 105—141 |
| 3,013,505 | 12/61 | Burke | 104—134 |
| 3,055,312 | 9/62 | Jay et al. | 104—134 |
| 3,090,327 | 5/63 | Crowley | 104—134 |

EUGENE G. BOTZ, *Primary Examiner.*

LEO J. LEONNING, LEO QUACKENBUSH,
*Examiners.*